Nov. 11, 1969   D. R. HOUSTON ET AL   3,477,306
MANUALLY OPERABLE GEARSHIFT LEVER ASSEMBLY
FOR AN AUTOMOTIVE VEHICLE
Filed March 27, 1968   4 Sheets-Sheet 1

DAVID R. HOUSTON
BENJAMIN T. HOWES
JAMES E. WARRICK
ALVIN W. ALEXANDROWICZ
INVENTORS

BY
ATTORNEYS.

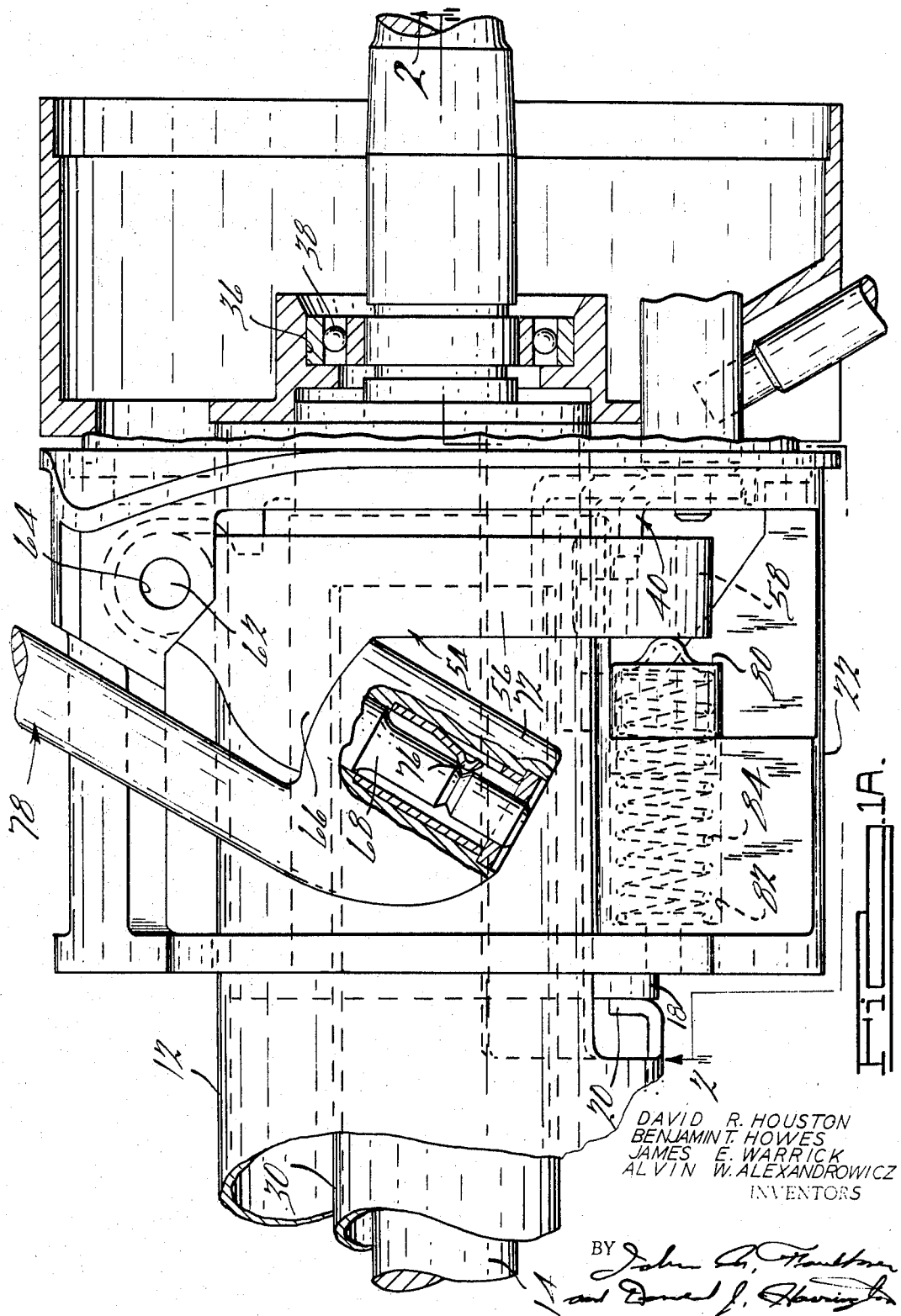
DAVID R. HOUSTON
BENJAMIN T. HOWES
JAMES E. WARRICK
ALVIN W. ALEXANDROWICZ
INVENTORS

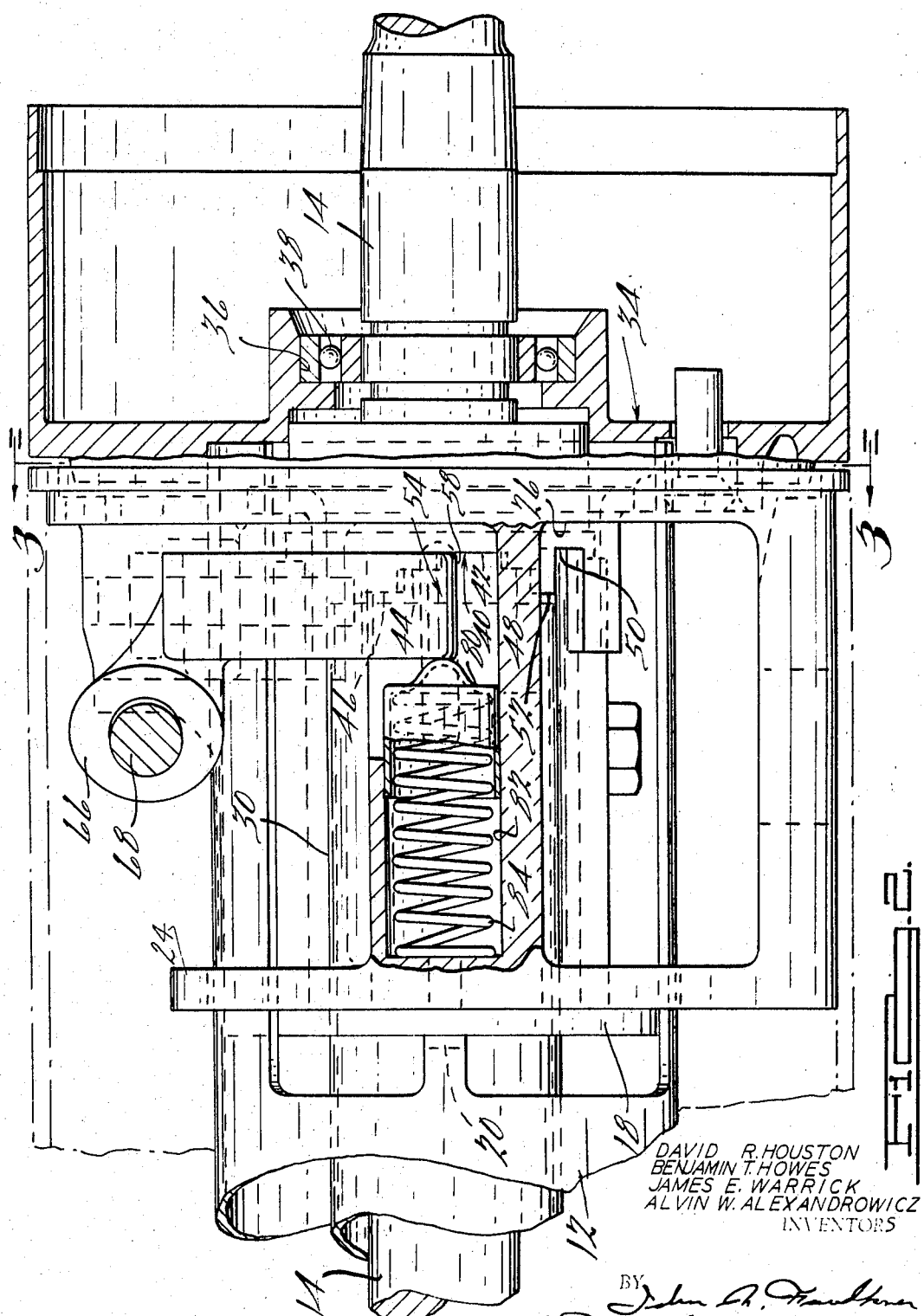

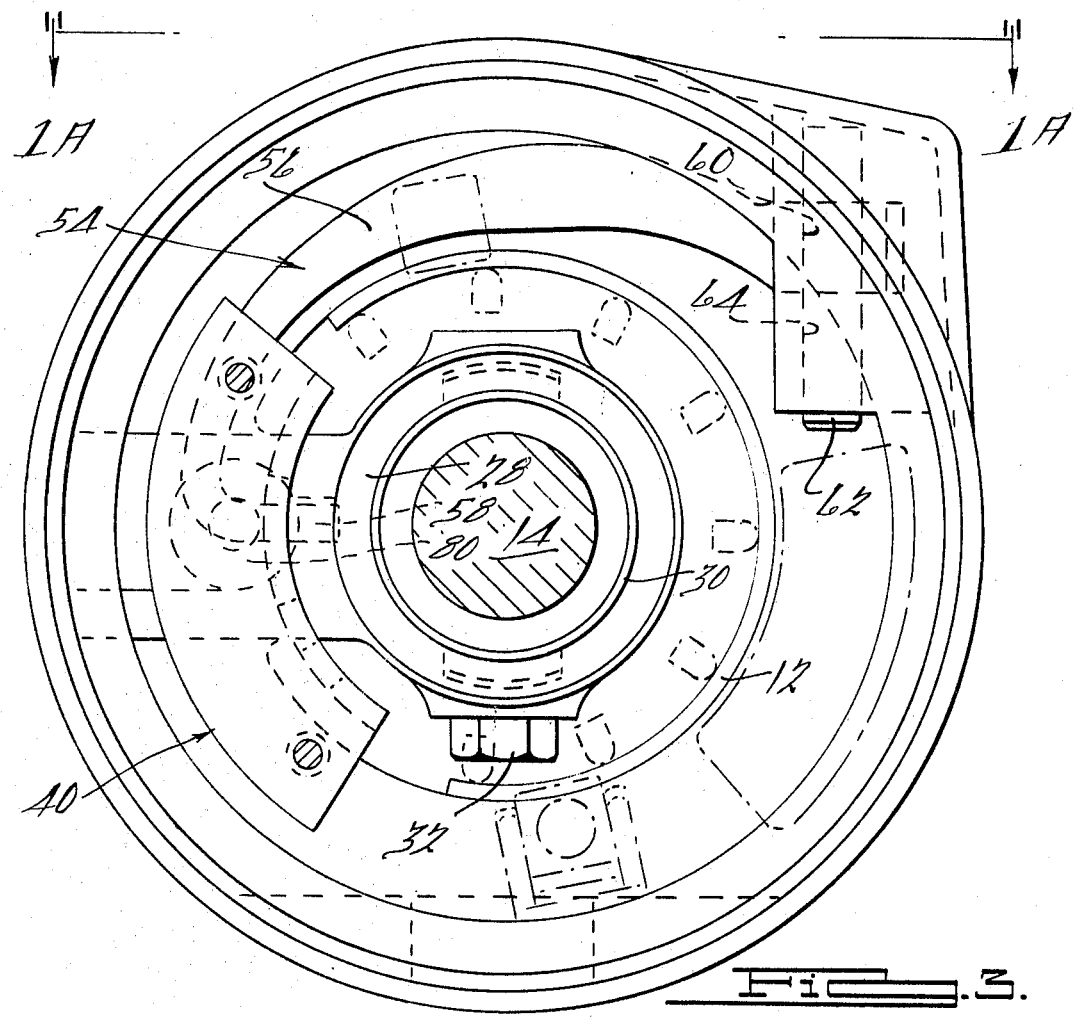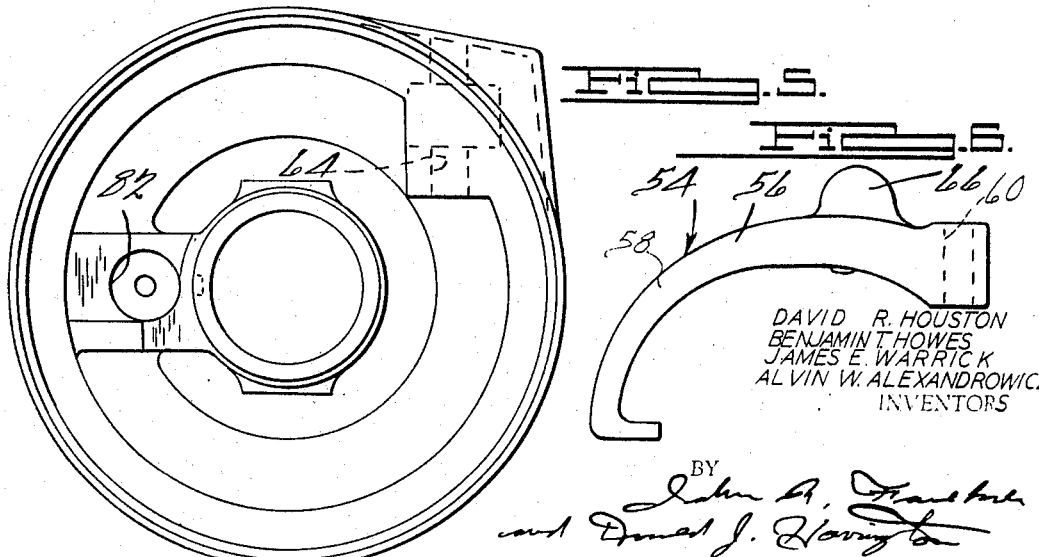

United States Patent Office 3,477,306
Patented Nov. 11, 1969

3,477,306
MANUALLY OPERABLE GEARSHIFT LEVER ASSEMBLY FOR AN AUTOMOTIVE VEHICLE
David R. Houston, Westland, Benjamin T. Howes and James E. Warrick, Birmingham, and Alvin W. Alexandrowicz, Warren, Mich., assignors to Ford Motor Company, Dearborn, Mich., a corporation of Delaware
Filed Mar. 27, 1968, Ser. No. 716,596
Int. Cl. G05g 11/00
U.S. Cl. 74—485
8 Claims

ABSTRACT OF THE DISCLOSURE

A manually controlled gearshift lever assembly for a steering post mounted gearshift linkage mechanism in an automotive vehicle. The assembly includes a gearshift lever having one end thereof situated within the hub region of the vehicle steering wheel. That end is connected mechanically to a ratio selecting pawl which engages a ratio controlling gate as the pawl is moved in a direction generally parallel to the axis of the steering column. The pawl is pivoted on a socket member which is fixed to a steering tube running concentrically with respect to the steering shaft. Rotary motion is imparted to the steering tube as the gearshift lever is rotated in a controlled pattern about the axis of the steering column. The inward end of the gearshift lever becomes released from the lever assembly if it is subjected to an impact load. The mechanical advantage of the gearshift lever system makes it possible to move the gearshift controlling elements of the system through the shift pattern determined by the gate structure with a minimum displacement of the extended end of the shift lever.

BRIEF SUMMARY OF THE INVENTION

Our invention is adapted especially to be used with automotive steering column assemblies having a gearshift controlling shaft extending in the direction of the steering shaft in the steering column assembly. A gearshift lever is mounted at the upper end of the steering column assembly with a grip portion thereof situated adjacent the steering wheel rim where it can be controlled readily by the vehicle operator. The inboard end of the shift lever extends within the steering wheel hub at the upper end of the steering column where it is attached by a releasable connection to a socket member secured to a gearshift controlling shaft in the steering column assembly. As the gearshift lever is subjected to an impact load, a releasable connection between the gearshift lever and the socket permits the lever to fall freely away from the column assembly. Provision is made for permitting reassembly of the gearshift lever following disassembly in this fashion. No special tools are required for this purpose.

A shift controlling pawl is connected pivotally to the socket at the upper end of the steering column assembly where it can engage a motion controlling gate connected to a fixed portion of the column assembly. This is done by connecting one end of the pawl to the inboard end of the gearshift lever so that the pawl can be moved in axial direction into or out of engagement with the gate. The gearshift controlling shaft can be rotated by appropriate rotating the end of the gearshift lever.

The pawl engages the gate at a location displaced 180° away from the releasable connection between the socket and the gearshift lever. This increases the mechanical advantage of the gearshift lever arrangement, thereby requiring a minimum displacement of the extended end of the gearshift lever as it is shifted in its ratio controlling shift pattern.

BRIEF DESCRIPTION OF THE FIGURES IN THE DRAWINGS

FIGURE 1A shows a partial, longitudinal, cross-sectional view of the upper end of a steering column assembly which includes the improved gearshift linkage mechanism of our invention.

FIGURE 2 is a side view of the structure of FIGURE 1A as seen from the plane of section line 2—2 of FIGURE 1A.

FIGURE 3 is a cross-sectional view taken along the plane of section line 3—3 of FIGURE 2.

FIGURE 5 is an end view of the socket member of FIGURE 4 as seen by plane section line 5—5 of FIGURE 4.

FIGURE 6 is a detail view of a pawl actuator arm used in the assembly of FIGURES 1, 2 and 3.

PARTICULAR DESCRIPTION OF THE INVENTION

Figure 1:
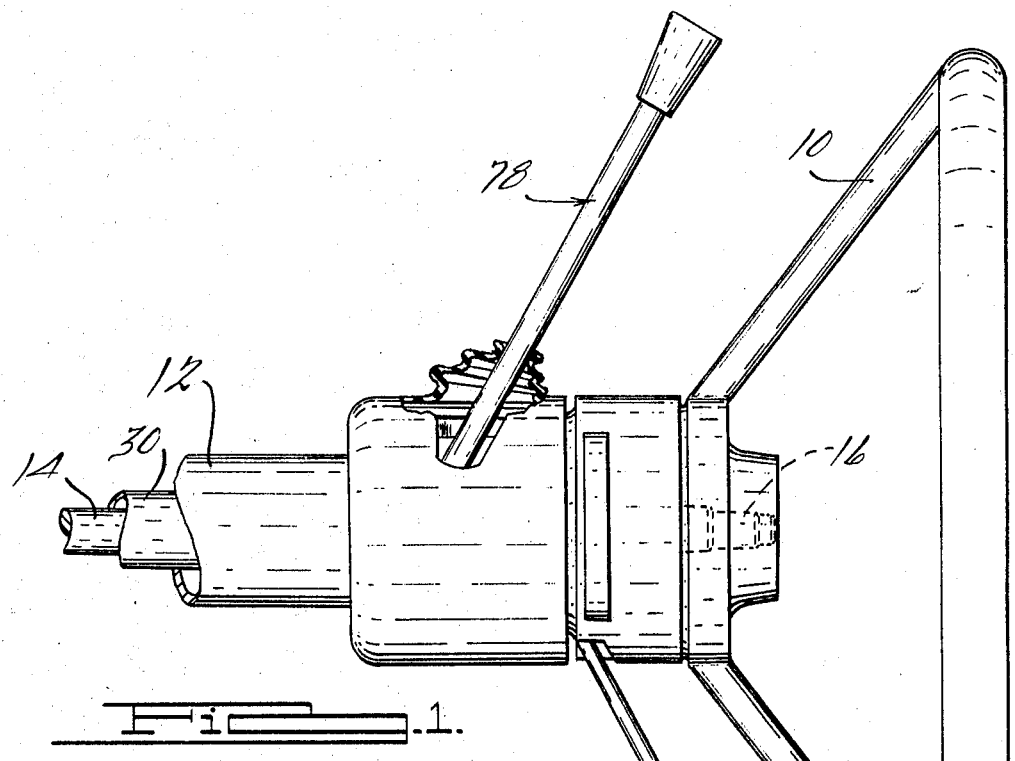
FIGURE 1 is a side elevation view of a vehicle steering column assembly with the improvement of our invention.
Figure 4:
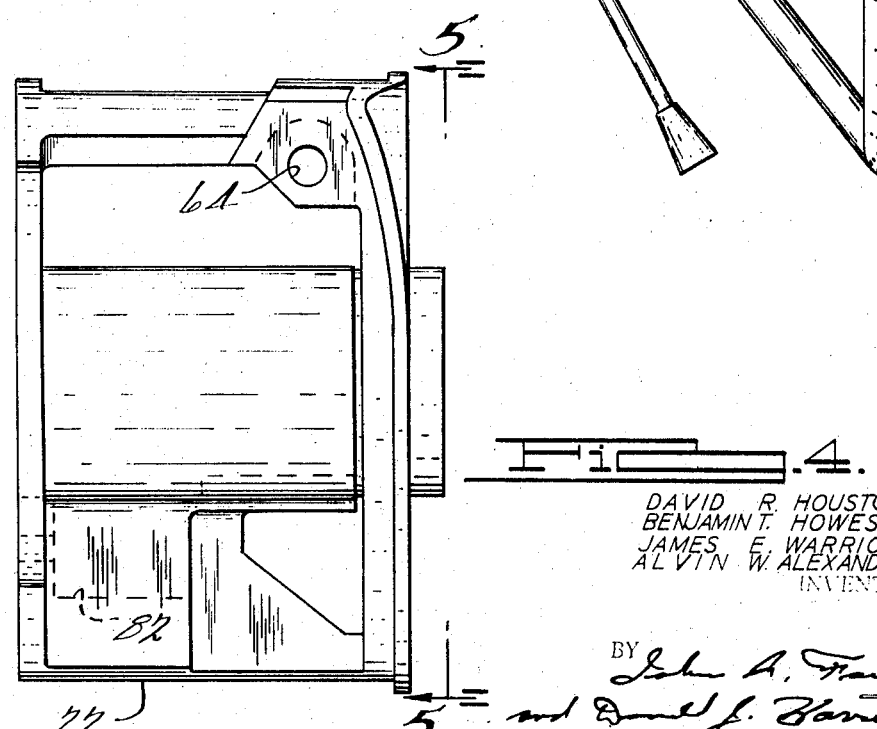
FIGURE 4 is a detail view of the socket member shown in FIGURES 1, 2 and 3.

In FIGURE 1 numeral 10 designates in outline form a steering wheel mounted on a steering column assembly. This assembly comprises a stationary tubular member 12 and a driver-operated steering shaft 14 which extends concentrically through the tube 12. Shaft 14 is connected by means of a splined connection 16 to steering wheel 10. A stationary wall 18 is secured to an inwardly directed flange 20 on the steering column member 12.

Secured to the wall 18 is a transmission socket member 22 which is provided with a first side opening 24 and a second side opening 26. The member 22 includes also a circular hub 28 which surrounds a gearshift control shaft in the form of a tube 30. The socket member 22 is secured directly to the shaft 30. A suitable key can be used for this purpose. In the alternative, the socket member 22 can be secured to the shaft 30 by means of a suitable lock bolt as indicated at 32 in FIGURE 3. Thus the socket member 22 rotates with the shaft 30, but it is secured fast to it.

The upper end of the steering column assembly includes a steering column hub 34. The hub 34 includes a bearing opening 36 situated on the axis of the steering shaft 14. The shaft 14 is journalled in the hub 34 by bearing 38.

A ratio selecting gate 40 is secured to the hub 34. It is generally of circular form, as indicated in FIGURE 3, with the center of curvature corresponding to the axis of the shaft 14. Gate 40 comprises first gate recess 42, which corresponds to the neutral position. A second drive range position is established by gate recess 44, and a first drive range position is established by gate recess 46.

Reverse drive is established by gate recess 48 and a park position for the gearshift lever is established by gate recess 50. Park recess 50 and the reverse recess 48 are separated by a boss 52. Registering with the recesses for the gate 40 is a pawl 54. In the position shown in FIGURE 2, the pawl is in the neutral recess.

As indicated best in FIGURE 6, the pawl 54 includes an arm 56 which is generally arched in form and which extends over the top of the steering shaft 14 and gearshift control shaft 30. It is provided at its free end with a pawl tooth 58, which registers with the gate recesses. The heel of the pawl 54 is provided with an opening 60 through which is received a pivot pin 62. The pin 62 is located in opening 64 formed in socket member 22. The pawl 54 thus can oscillate about the axis of the pin 62 so that the tooth 58 will move generally in an axial direction with respect to the axis of shaft 14.

The heel of the pawl 54 is provided with a boss 66. Extending from the boss 66 is a gearshift lever spindle 68 having a detent recess 70. Slidably received over the spindle 68 is a gearshift lever mounting boss 72 having an aperture 74 for receiving the spindle 68. Spring clips indicated generally at 76 are secured in the opening 74 so that they register with the recess 70 when the gearshift lever is assembled on the spindle 68 thereby resisting removal of the gearshift lever. This lever construction is described more particularly in the co-pending application Ser. No. 692,347, filed Dec. 21, 1967, both this invention and the invention of the co-pending application have a common assignee.

The gearshift lever itself is designated by reference character 78. At its free end it is provided with a grip which may be moved by the operator in a plane parallel to the steering wheel with the axis of the steering shaft 14 as its center. This will effect rotary motion of the shift controlling tubular shaft 30. This motion, of course, is controlled by the gate 40 and by cooperating pawl 54.

When the lever 78 is moved to a new plane of oscillation, the pawl 54 moves out of registry with one or the other of the gate recesses thereby permitting rotary motion of the gearshift lever to the desired drive range position.

Unlike conventional gearshift constructions, the distance between the pivot point for the gearshift lever and the end of the cooperating pawl tooth which registers with the gearshift lever motion controlling gate, the tooth 58 in our improved construction is located a substantial distance from the axis of the pin 62. This increases the motion advantage of the gearshift lever as the various drive range positions are selected. It is possible therefore for the vehicle operator to move the end of the gearshift lever during drive range changes with a minimum displacement. This provides greater operator control without increasing the complexity of the mechanism and without increasing the shift effort.

The pawl 54 is engaged by a plunger 80 as indicated best in FIGURE 1A. This plunger is received slidably within a cylindrical opening 82 formed in the end of the gearshift socket member 22. A spring 84 seated in the opening 82 acts against the plunger 80 thereby urging the latter into engagement with the pawl 54 to normally urge the tooth 58 into engagement with one of the gate recesses.

If the gearshift lever should be subjected to an impact load, it will become disengaged from the spindle 68. There then will be no protrusion extending from the hub of the steering column. After the gearshift lever is dis-assembled, it readily can be reassembled simply by forcing the end of the gearshift lever over the spindle 68.

It is possible to use features of this improved gearshift lever mechanism in a manually controlled gearshaft lever assembly. In such case the end of pawl 54 would engage the gearshift shaft 30 so that the latter might be shifted axially as well as rotated. In the embodiment disclosed in this specification, however, the shaft 30 is not connected directly to the pawl. Since only rotary motion is required as the shaft 30 is rotated from one position to another, it effects shifting movement of a drive range selector valve in an automatic control valve system, not shown.

Having thus described a preferred form of our invention, what we claim and desire to secure by U.S. Letters Patent is:

1. A manually operable gearshift lever assembly in combination with an automotive vehicle steering column comprising a transmission ratio controlling shaft supported by the steering column, a steering column socket member connected to said ratio controlling shaft at the upper end of said steering column, a ratio selecting pawl pivoted on said socket member and extending in cantilever fashion from the point of its pivotal connection to a point situated on the remote side of the axis of said steering column, the pivotal axis of said pawl being generally transverse to the direction of the axis of said column, a gate secured to said column including gate recesses arcuately spaced with respect to the axis of motion of said socket member, a gearshift lever extending in cantilever fashion from said socket member, and a releasable connection between the radially inward end of said gearshift lever and said pawl including registering parts thereon whereby said gearshift lever becomes disassembled when it is subjected to an impact load.

2. The combination as set forth in claim 1 wherein said pawl comprises a pawl tooth located on one side of the axis of said column, the pivotal connection between said pawl and said socket member being situated remotely with respect to said tooth on the opposite side of the axis of said column whereby the motion advantage made available to said gearshift lever is increased during manual selection of the gate recesses.

3. The combination as set forth in claim 1 wherein said socket member is connected directly to said ratio controlling shaft and rotatably in unison therewith, said ratio controlling shaft being journalled for rotation about the axis of said column, said column including a tubular, stationary housing surrounding said ratio controlling shaft in coaxial relationship therewith.

4. The combination as set forth in claim 2 wherein said socket member is connected directly to said ratio controlling shaft and rotatably in unison therewith, said ratio controlling shaft being journalled for rotation about the axis of said column, said column including a tubular, stationary housing surrounding said ratio controlling shaft in coaxial relationship therewith.

5. The combination as set forth in claim 1 wherein the free end of said pawl, as it is moved about the axis of its pivotal connection with said socket member, is adapted to be displaced in a generally axial direction with respect to the axis of said column, and spring means normally biasing said pawl toward a position in which said pawl registers with said gate.

6. The combination as set forth in claim 2 wherein the free end of said pawl, as it is moved about the axis of its pivotal connection with said socket member, is adapted to be displaced in a generally axial direction with respect to the axis of said column, and spring means normally biasing said pawl toward a position in which said pawl registers with said gate.

7. The combination as set forth in claim 3 wherein the free end of said pawl, as it is moved about the axis of its pivotal connection with said socket member, is adapted to be displaced in a generally axial direction with respect to the axis of said column, and spring means normally biasing said pawl toward a position in which said pawl registers with said gate.

8. The combination as set forth in claim 4 wherein the free end of said pawl, as it is moved about the axis of its pivotal connection with said socket member, is adapted to be displaced in a generally axial direction with respect to the axis of said column, and spring means normally biasing said pawl toward a position in which said pawl registers with said gate.

References Cited
UNITED STATES PATENTS 2,823,556  2/1958  Cislo _____ 74—484 X MILTON KAUFMAN, Primary Examiner